United States Patent [19]

Barry et al.

[11] Patent Number: 5,276,879
[45] Date of Patent: Jan. 4, 1994

[54] PORTABLE, RESOURCE SHARING FILE SERVER USING CO-ROUTINES

[75] Inventors: Timothy G. Barry, New Hope, Minn.; George H. Robbert, Ft. Collins, Colo.; James R. Conrad, Boise, Id.

[73] Assignee: Hewlett-Packard Company, Palo Alto, Calif.

[21] Appl. No.: 979,350

[22] Filed: Nov. 20, 1992

Related U.S. Application Data

[63] Continuation of Ser. No. 429,681, Oct. 31, 1989, abandoned.

[51] Int. Cl.⁵ .................................. G06F 9/46
[52] U.S. Cl. ..................... 395/650; 395/200; 364/242.95; 364/281.4; 364/281.8
[58] Field of Search ............... 395/200, 600, 650, 700; 364/242.95, 281.3, 281.4, 281.6, 281.8

[56] References Cited

U.S. PATENT DOCUMENTS

| | | | |
|---|---|---|---|
| 4,084,224 | 4/1978 | Appell et al. | 395/700 |
| 4,297,743 | 10/1981 | Appell et al. | 395/650 |
| 4,410,940 | 10/1983 | Carlson et al. | 395/650 |
| 4,447,874 | 5/1984 | Bradley et al. | 395/650 |
| 4,688,166 | 8/1987 | Schneider | 364/200 |
| 4,694,396 | 9/1987 | Weisshaar et al. | 395/200 |
| 4,805,097 | 2/1989 | De Sanna | 364/200 |
| 4,835,685 | 5/1989 | Kun | 364/200 |
| 4,975,830 | 12/1990 | Gerpheide et al. | 364/200 |
| 4,999,766 | 3/1991 | Peters et al. | 364/200 |
| 5,047,925 | 9/1991 | Kun et al. | 364/200 |
| 5,060,140 | 10/1991 | Brown et al. | 364/200 |
| 5,062,040 | 10/1991 | Bishop et al. | 364/200 |

FOREIGN PATENT DOCUMENTS

| | | | |
|---|---|---|---|
| 0257655 | 3/1988 | European Pat. Off. | G06F 9/46 |
| 0312739 | 4/1989 | European Pat. Off. | G06F 15/16 |
| WO81/02645 | 9/1981 | PCT Int'l Appl. | |

*Primary Examiner*—Gareth D. Shaw
*Assistant Examiner*—Dennis M. Butler

[57] ABSTRACT

Disclosed is a resource sharing system having a host computer and a plurality of a client computers connected by a Local Area Network (LAN). Resource sharing software, located in the host, is comprised of a supervisor process, a spooler process, and a plurality of session worker processes. This supervisor receives an initial call request from a client, and creates a session worker to handle all subsequent requests from that particular client. Each session worker creates a plurality of co-routines, one for each concurrent request, which operate to provide a high-performance response to the network. Co-routines share the session worker stack, as well as all other areas in the session worker. Because co-routines never interrupt each other, there is no competition for resources, and no need for critical sections of software.

11 Claims, 12 Drawing Sheets

PORTABLE, RESOURCE SHARING FILE SERVER USING CO-ROUTINES

This is a continuation of copending application Ser. No. 07/429,681 filed on Oct. 31, 1989, now abandoned.

BACKGROUND OF THE INVENTION

This invention relates to Computer systems and more particularly to methods of sharing data over Local Area Networks. Even more particularly, the invention relates to using co-routines in a file server host computer to provide file access services to a plurality of client computers over a Local Area Network.

A typical computer system is comprised of a processor, memory, and mass storage devices, such as hard disks. Large mainframe computers usually have many terminals attached wherein each user accesses the mainframe through one of the terminals. In smaller systems, such as engineering workstations and personal computers, the computer has a keyboard and display through which the user accesses the computer. Many different computers systems, each using a different processor, are in use today. Within each computer system, an operating system performs basic functions for the application software which actually performs the work for the user. MS-DOS is a typical operating system used in personal computers, whereas UNIX is an operating system that is used in personal computers, engineering work stations, and even large mainframes.

Originally users could only access data that was available on the mass storage device of the particular computer they were using. As the use of personal computers spread during the early 1980's, more and more users desired to access data that was located on other computers. Originally this access was done via very low speed communications links, such as RS/232. As the need for more data access between computers became greater, high speed Local Area Networks (LAN's) were developed. Local Area Networks are designed to transfer data at very high rates of speed, typically ten million bits per second, and are very suitable for sharing data between computers. With the high speed data transfer availability of Local Area Networks, the sharing of other resources, such as a common printer, became possible.

A resource sharing computer system typically consists of a host computer connected to a Local Area Network. The LAN is also connected to a series of client computers, each of which use the common resources of the host computer. Usually a client computer will use the disk of the host computer to store all of its data. The client computer will also use the printers and other common resources located on the host computer. In order to provide these services, the host computer must have resource sharing software which performs the desired services for the client computers. For example, several client computers might send print data to the host computer, and software within the host computer must keep the print data from each client computer separate.

When the client computers are running a small operating system, such as MS-DOS, and the number of client computers is small, the workload on the host computer is also small and a simple file serving system will suffice. However, as the number of client computers increases, and these computers run multi-tasking operating systems, such as UNIX or OS/2, the workload on the host system increases significantly. As this workload increases, particularly with client computers having multi-tasking operating systems capable of sending multiple requests concurrently, the performance requirements of the host server becomes significant.

Another problem with host server systems, is that they must be designed to be capable of running on many different host processors. Ideally, a host server program would be capable of running on all machines capable of being used as a host computer. To provide this portability, the host server software must be easily moved from one machine type to another, and it must run without modifying the operating system of the host computer.

Another problem that often arises in the design of host resource-sharing systems, is that the number of files needing to be accessed by the server exceeds the capability of a single process on the host computer system. Therefore, the host server must be split into multiple processes, each serving some subset of the client computer systems.

It is thus apparent that there is need in the art for an improved host resource server that will provide a high-performance response to a large number of client computers over a Local Area Network. There is also a need in the art for such a system that is capable of processing a plurality of simultaneous requests from each client computer. There is also a need in the art for such a system that runs without modifying the host computer operating system. There is a further need for such a system which is highly portable between several types of host computer processors. Still another need is for such a system that is highly portable between several computer programming languages. A still further need is for such a system that will allow access to a very large number of files on the host computer system.

SUMMARY OF THE INVENTION

It is an object of the present invention to provide a file sharing system for sharing file data between a host computer and a plurality of client computers.

It is another object of the invention to provide a high performance response in such system.

Another object is to provide such a system without modifying the host computer operating system.

Another object is to provide such a system which is highly portable between several types of host computer processors.

Another object is to provide such a system that is highly portable between several computer programming languages.

Yet another object is to provide such a system that is implemented without critical sections of software.

Still another object of the invention is to provide a system that uses multiple levels of processing routines.

A further object of the invention is to provide such a system that has a supervisor process which processes all initial calls from client computers and connects each client computer to the host.

A still further object of the invention is to provide such a system wherein the supervisor process creates a separate session worker process for each client computer.

A further object is to provide such a system wherein each such session worker process uses a separate co-routine for each client computer request.

A further object is to provide such a system wherein the co-routines share the session worker processes memory.

A further object is to provide such a system wherein the same programming instructions are shared by all such co-routines.

A further object of the invention is to provide such a system wherein such co-routines are not preempted while running, and each is allowed to run until it has to wait on a resource or operation of the host computer.

A still further object of the invention is to provide such a system that is useable for numerous applications which have parallel requests that require data in a high-performance, non-blocking fashion.

The above and other objects are accomplished in a system having a host computer and a plurality of client computers connected by a Local Area Network. Resource sharing software, located in the host computer, is comprised of a supervisor process (also called a daemon process), a spooler process, and a plurality of session worker processes, one for each client computer. The supervisor process receives an initial call request from a client computer, and it creates a session worker process to handle all subsequent requests from that particular client computer.

Each request from a client computer is called a service message block (SMB) request, and each client computer may transmit several SMB requests without waiting for a response from the session worker for each individual request. Therefore, each session worker may be processing several client computer SMB request concurrently.

Each session worker process creates a plurality of co-routines which operate in parallel, similar to each task in a multi-tasking operating system. The session worker process starts a new co-routine for each SMB request received. The co-routine runs in parallel with all other co-routines processing other SMB requests, thus the session worker is able to provide a high-performance response to each request from a client computer.

Although similar to tasks, co-routines have some very significant differences. Co-routines share the session worker stack, as well as all other memory areas in the session worker. Co-routines are not time-sliced, instead they perform until they have completed their task, or until they are blocked by the need to wait on an unavailable resource. When complete, or when blocked, a co-routine gives up the processor to the next co-routine ready to perform work. Because a co-routine is never interrupted by another co-routine, there is no competition for resources, and thus no need for critical sections of code.

The software in each co-routine is divided into multiple levels, with all levels above level zero being written in a high level language, to be independent of the processor hardware. Therefore, if the system needs to be converted to a different processor, only level zero routines within the co-routine software need to be converted. The software for each co-routine is re-entrant, therefore, only one copy of the software need exist in memory in order for several co-routines to process concurrently.

Each session worker process is dedicated to one and only one client computer. Therefore, the session worker process need not provide any file protection between client computer files, and can rely on the underlying operating system for such file protection.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
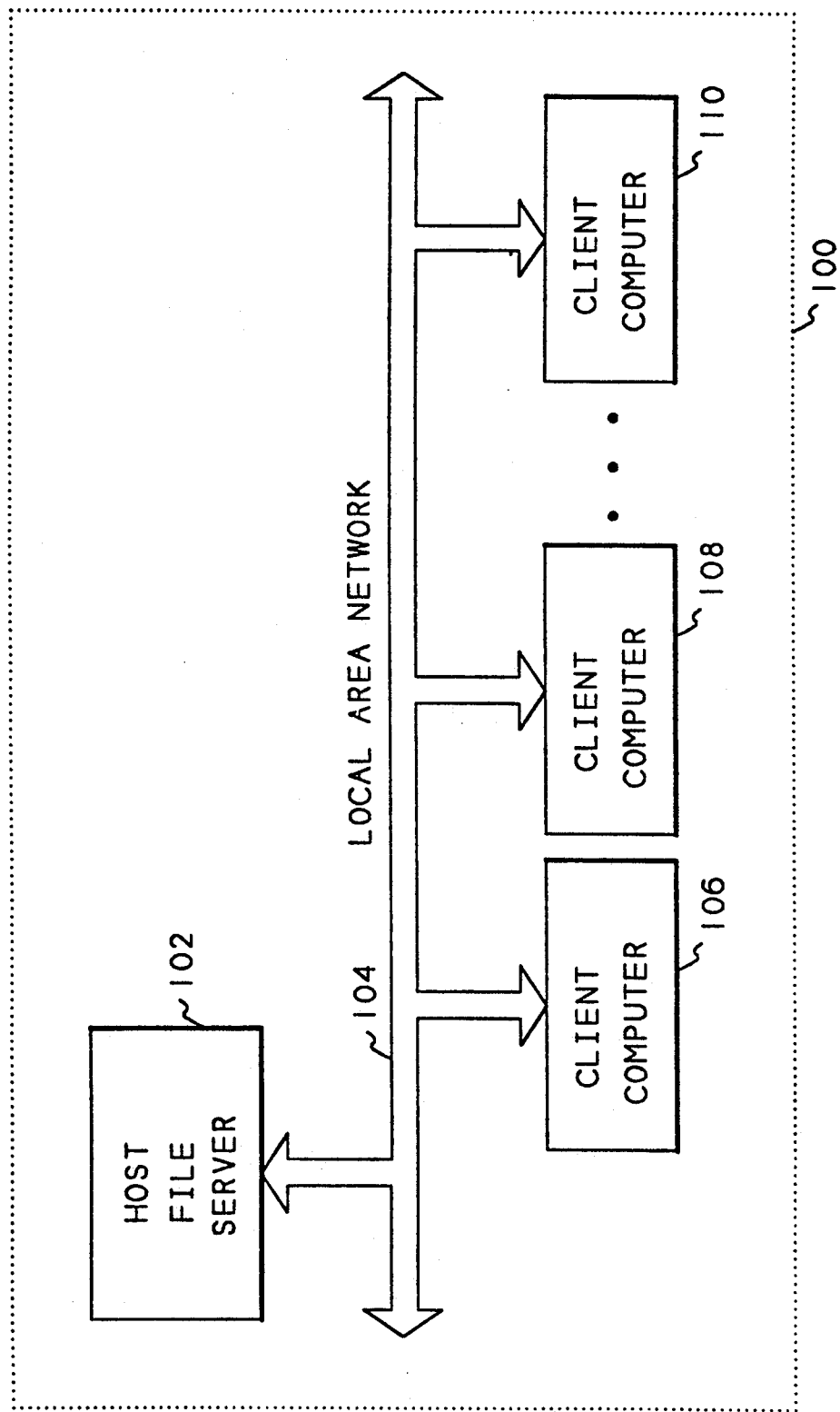
FIG. 1 is a block diagram of a Local Area Network of the present invention, including a host file server and several client computers.

FIG. 1 is a block diagram of a Local Area Network system comprising a host resource server and a plurality of client computers. Referring now to FIG. 1, a Local Area Network system 100 is shown having a host resource server computer 102 which is connected to a Local Area Network 104. Also connected to the Local Area Network 104 are a plurality of client computers 106, 108, and 110. The host resource server 102 shares its resources with the client computers 106, 108, and 110. These resources may include disk files, printers, and plotters, etc. The host resource server 102, is said to "offer" resources to the network.

Messages sent between the host resource server 102 and the client computers 106, 108, and 110, are exchanged using a protocol called the Server Message Block (SMB). The SMB protocol is a standard protocol that allows operating systems such as MS-DOS, OS/2, and UNIX to share resources between multiple computers on a Local Area Network. In a typical environment, a computer running the OS/2 operating system may function concurrently as both a network server and a client computer. A computer running the MS-DOS operating system, however, may operate either as a network server, or as a network consumer, but not ordinarily as both. A computer running the UNIX operating system may only operate as a host resource server.

Figure 2:
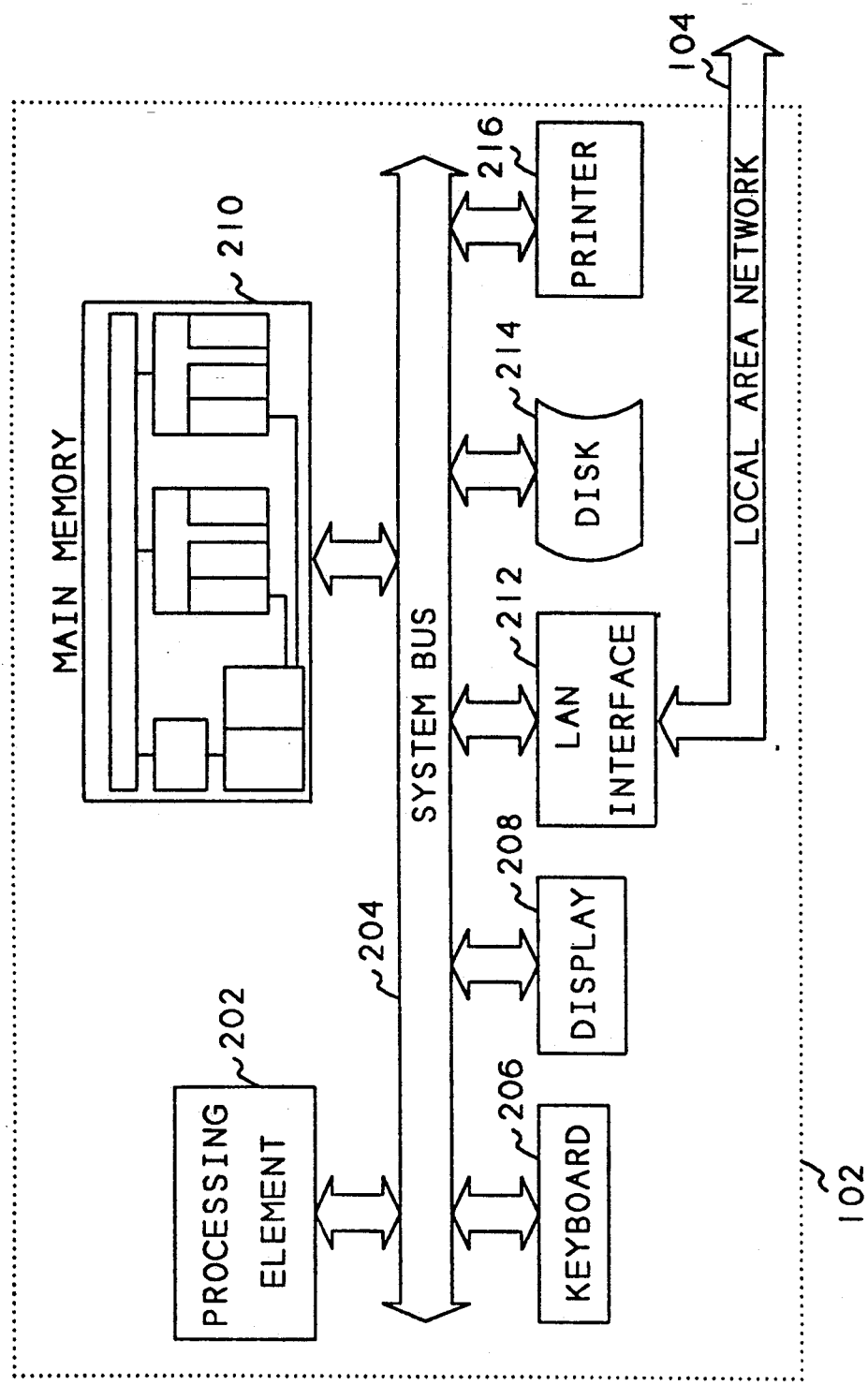
FIG. 2 is a block diagram of a computer system, suitable for use as a host computer in a Local Area Network of the present invention.

FIG. 2 is a block diagram of a computer system, suitable for use as the host resource server 102 of FIG. 1. Referring now to FIG. 2, the host resource server computer 102 contains a processing element 202 which communicates with other components of the system over a system bus 204. A keyboard 206, and display 208 are used to communicate with an operator of the system. The system communicates to the client computers (106, 108, and 110 of FIG. 1) through a LAN interface 212 and a Local Area Network 104. The computer system 102 includes a disk 214 which includes files that will be shared over the Local Area Network 104. The system 102 also includes a printer 216 which can be shared over the Local Area Network 104. A main memory 210 contains the software of the present invention, and will be described below. Other devices may be attached to the system bus 204, and these devices may also be shared over the Local Area Network 104.

Figure 3:
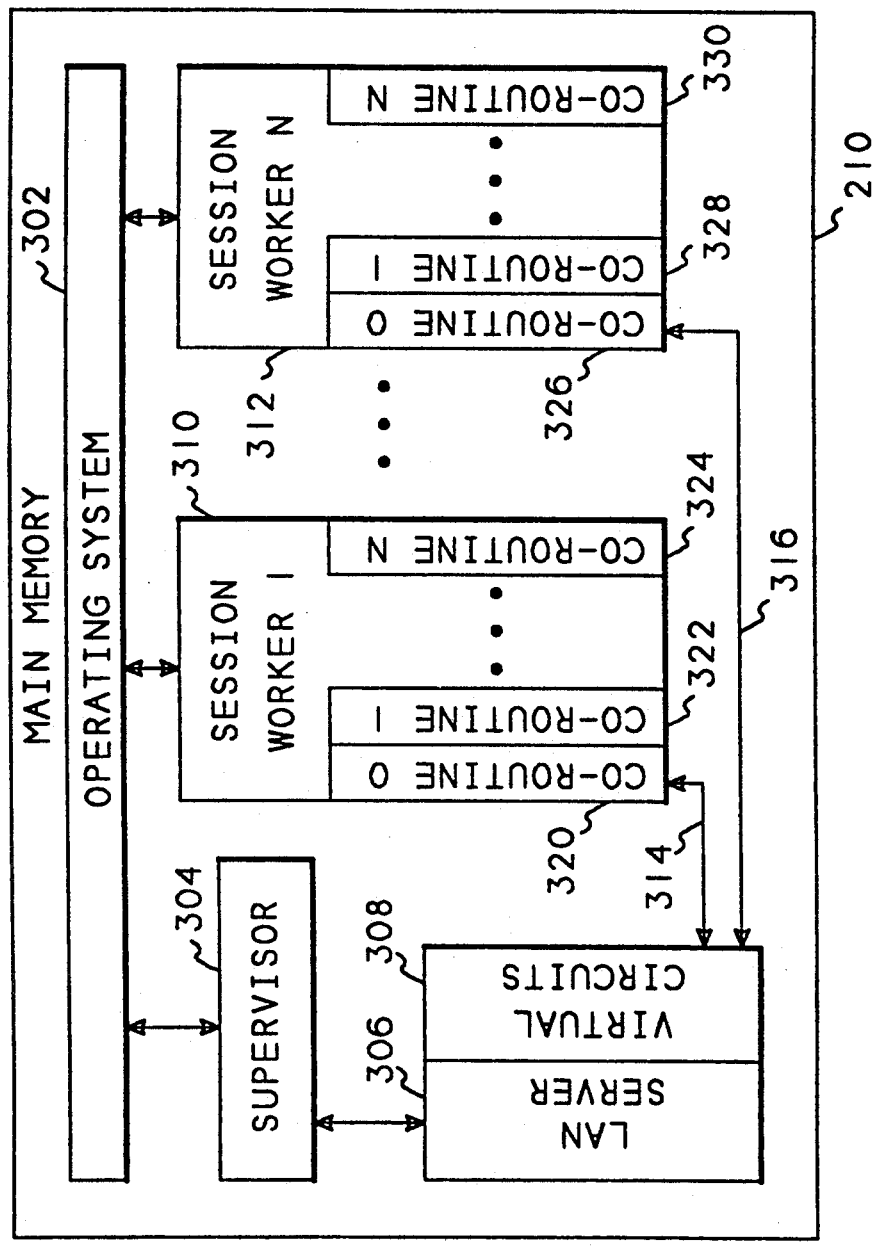
FIG. 3 is a block diagram of the main memory of the computer of FIG. 2, showing the processes of the resource-sharing system of the present invention.

FIG. 3 shows a block diagram of the main memory 210 of FIG. 2, and illustrates the various processes involved in the resource server. Referring now to FIG. 3, an operating system 302, typically the UNIX operating system, resides within the memory 210. A supervisor program 304, also called a daemon process, receives an initial call request from one of the client computers (106, 108, or 110 of FIG. 1) by way of LAN server software 306. The LAN server software 306 interacts with the LAN interface 212 (FIG. 2) to send and receive messages via the Local Area Network 104 (FIG. 2). When the supervisor process 304 receives a call request from a client computer, it creates a session worker process 310 to handle all interaction with the client computer. When subsequent call requests are received by the supervisor process 304, additional session workers 312 will be created for each client computer. A session worker process is established for each client computer that connects to the resource server, so there is a one-to-one relationship between session worker processes and client computers.

The supervisor process 304 and each of the session worker processes run as tasks under the operating system 302, and therefore run concurrently.

As a session worker process is set up by the supervisor 304, the session worker is connected to the client computer by way of one of a plurality of virtual circuits 308. These connections are graphically shown as the lines 314 and 316. Once connected to the client computer, the session worker operates independently of the supervisor 304, and processes all subsequent requests from the client computer that arrive via the virtual circuits 308.

A connection, not shown in FIG. 3, is retained between the session worker processes. This connection is called an administrative instruction queue and allows a session worker to cause another session worker to perform requests that may arrive from sources other than the client computer to which the session worker is attached. One of these requests, is to break an "opportunistic lock". An opportunistic lock occurs when a client computer has sole access to a file in the host server. Because the client computer has exclusive access, the client computer is allowed to retain file buffers for its exclusive use. The retention of these buffers is called the opportunistic lock. Should a second client computer desire access to a file that is locked by another client computer, the supervisor 304 must pass a message to the session worker serving the first client computer to cause it to release the buffers and remove the opportunistic lock. Other requests may also be passed via the administrative instruction queue.

Once established, a session worker process proceeds to establish a plurality of co-routines that operate within its address space. Co-routine zero (0) serves as the session worker's main process loop, to service the queues and wait for work to arrive. When an SMB request arrives via the virtual circuit, co-routine 0 receives the SMB request, and starts one of the other co-routines to process the request. If the SMB request can be satisfied without having to wait on some other computer resource (i.e. without being blocked), the processing co-routine exits and returns to co-routine 0 after transmitting its SMB response. If the request cannot be immediately satisfied, for example an input/output (I/O) operation, the processing co-routine is blocked so it switches control to co-routine 0, which will then schedule some other co-routine that is ready to perform work. Thus, co-routine 0 acts as a scheduler for the session worker's activities.

Co-routine 1 of each session worker processes all administrative instruction queue requests from other session workers. Co-routines 2 and above process request from client computers.

Whenever the awaited event occurs, such as completion of an I/O operation or completion of a time-out, the blocked co-routine is marked ready and will be given control at the next opportunity. Note that blocking a co-routine does not block the session worker process, and that the session worker process is always free to receive an additional SMB request and start an additional co-routine. A session worker that has completed all outstanding work, and receives no additional work for a predetermined period of time, may terminate itself to free up memory space within the host resource server computer.

Figure 4:
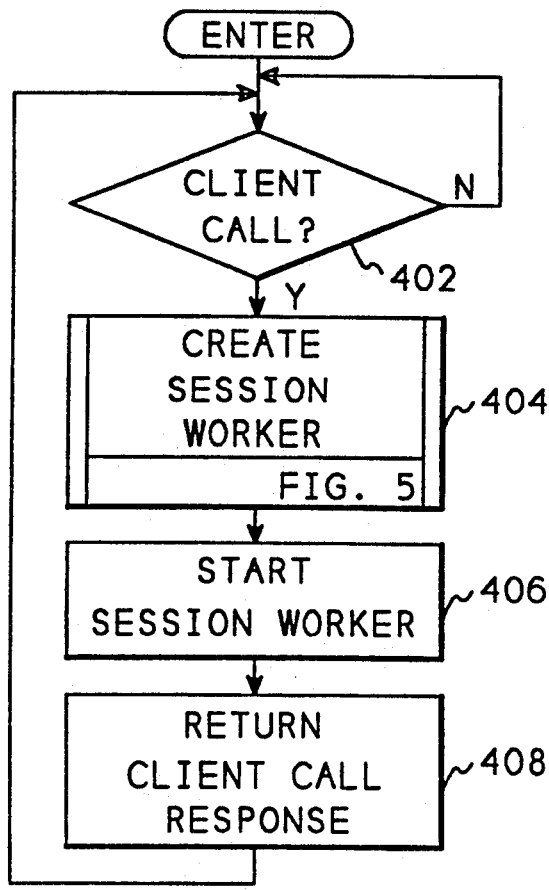
FIG. 4 is a flowchart of the processes of the supervisor program of the present invention.

FIG. 4 shows a flowchart of the supervisor process receiving a call from a client computer. Referring now to FIG. 4, after entry, block 402 waits for a client call request from the LAN server 306 (FIG. 3). After receiving the client call, block 404 calls FIG. 5 to create a session worker process to handle all future SMB requests from this client. After creating the session worker, block 406 then starts execution of the session worker. Since the session worker has been started as a concurrent process under the host operating system, once the session worker is started no further action is required on the part of the supervisor. After starting the session worker, block 408 returns a client call response to tell the client computer that the session worker has been started. Block 408 then transfers to back block 402 to await a client call from another client computer.

Figure 5:
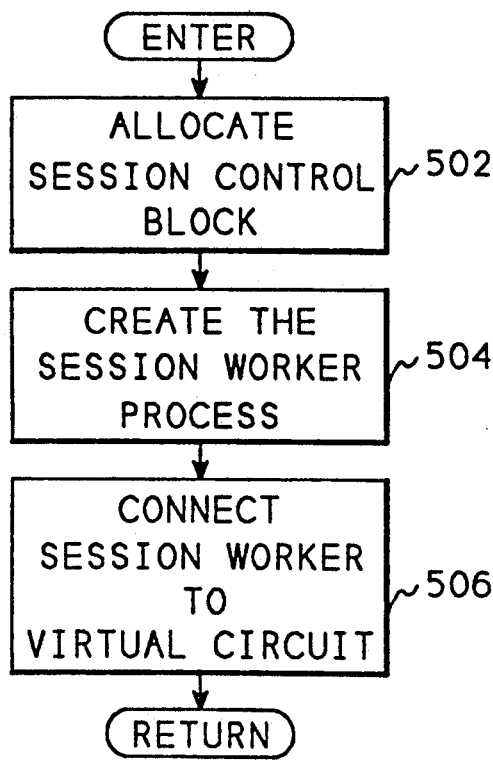
FIG. 5 is a flowchart of the process of creating a session worker.

FIG. 5 is a flowchart of the process of creating a session worker. Referring now to FIG. 5, after entry, block 502 allocates a session control block under the host operating system, which is typically the UNIX operating system. Block 504 then starts the session worker as a process that will operate as a separate task, parallel to the supervisor. Block 506 then connects the session worker to the virtual circuit which will send and receive messages to the client computer that originally requested the call. After connecting the session worker to the virtual circuit, block 506 returns to FIG. 4.

Figure 6:
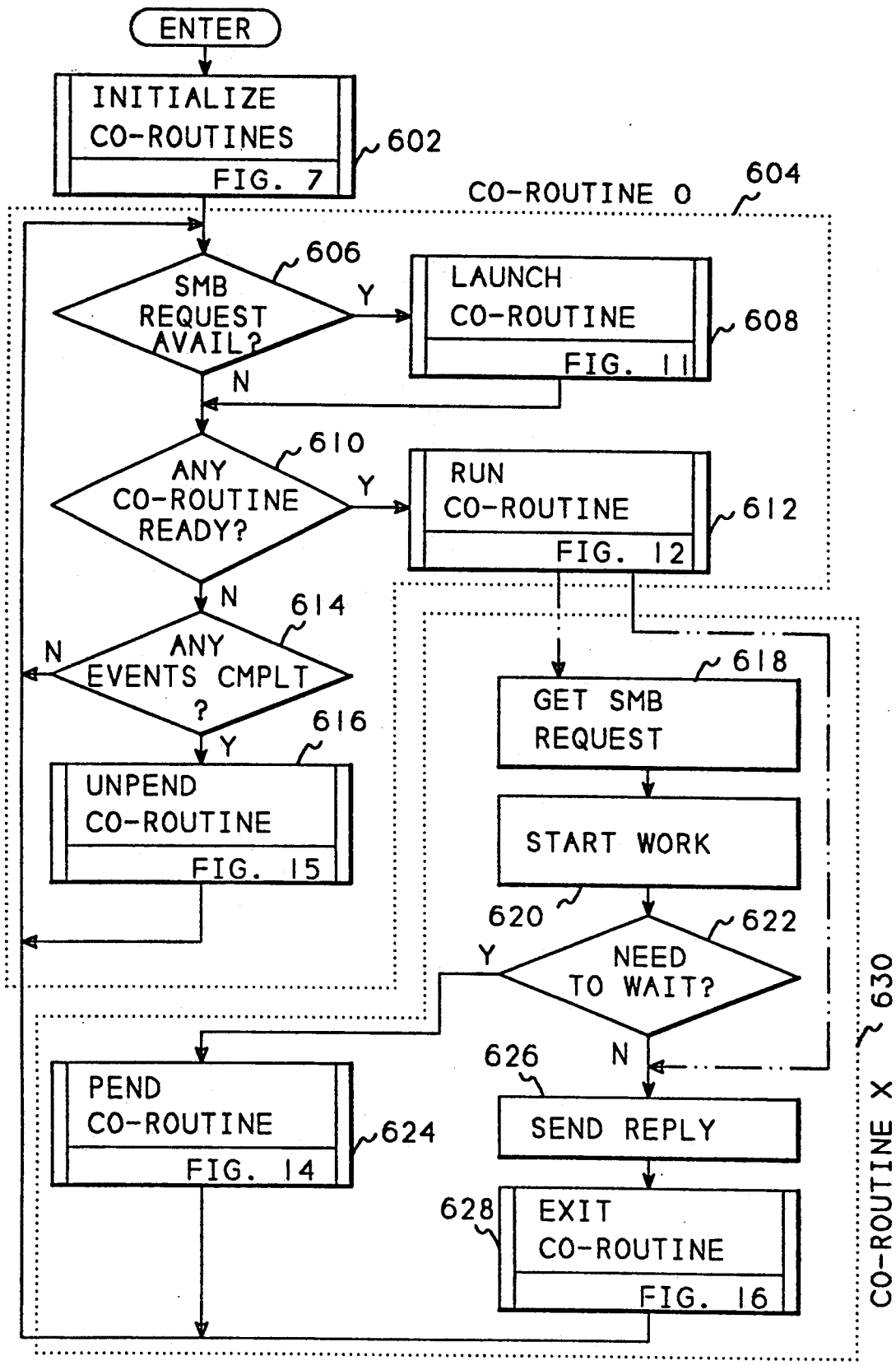
FIG. 6 is a flowchart of the session worker process of the present invention.

FIG. 6 shows a flowchart of a session worker process. Referring now to FIG. 6, after entry, block 602 calls FIG. 7 to create and initialize the co-routines that will be used within the session worker. After initializing the co-routines, the session worker is running in co-routine 0. The functions of co-routine 0 are outlined by the dashed line 604. Upon entering co-routine 0, block 606 determines whether an SMB request has been received from the client computer. If such a request has been received, block 606 transfers to block 608 which calls FIG. 11 to set up a co-routine to process the request. After the co-routine has been set up, or if no SMB request is available, control goes to block 610 which determines whether any existing co-routine is ready to perform work. If a co-routine is ready, control transfers to block 612 which calls FIG. 12 to run one of the co-routines that is ready to process work. If no co-routine is ready to process work, control transfers to block 614 which checks to see if any events have completed. If one or more events has completed, control goes to block 616 which calls FIG. 15 to un-pend any co-routines whose events have completed. After un-pending these co-routines, block 616 transfers back to block 606 to complete the main loop. The processing loop consisting of block 606, block 610, block 614, and block 616, will continue in operation until an SMB request is received or until some co-routine is ready to run because its event has completed.

Once a co-routine is in a ready state, meaning that it is available to run, block 612 will switch the context of the session worker process to execute the ready co-routine. When a co-routine was initially launched by block 608, its entry point was set up to be block 618. Therefore, when an SMB request is initially received, block 608 will set up a co-routine to process that request and block 612 will transfer to block 618 to start processing the SMB request. Block 618 will get the request from the virtual circuit, and block 620 will start processing the work. If during the processing of the work requested, a need arises to wait on some event, for example waiting on the completion of an input/output request, block 622 will transfer to block 624 which calls FIG. 14 to place the co-routine into a pending STATE. After placing the co-routine in a pending STATE, block 624 will transfer back to block 606, the main processing loop. After the sended operation is complete, and block 616 has unpended the co-routine, block 612 will transfer back into the co-routine at block 626. Block 626 will also receive control from block 622 if a pend of the co-routine was not needed. After receiving control, block 626 will created and send an SMB reply back to the client computer that made the original SMB request. After sending the reply, block 626 will transfer to block 628 which calls FIG. 16 to exit the co-routine. Since the co-routine has completed all the work requested in the original SMB request, FIG. 16 will deactivate the co-routine and place it back into a free state. Then block 628 will transfer back to the main processing loop at 606.

Figure 7:
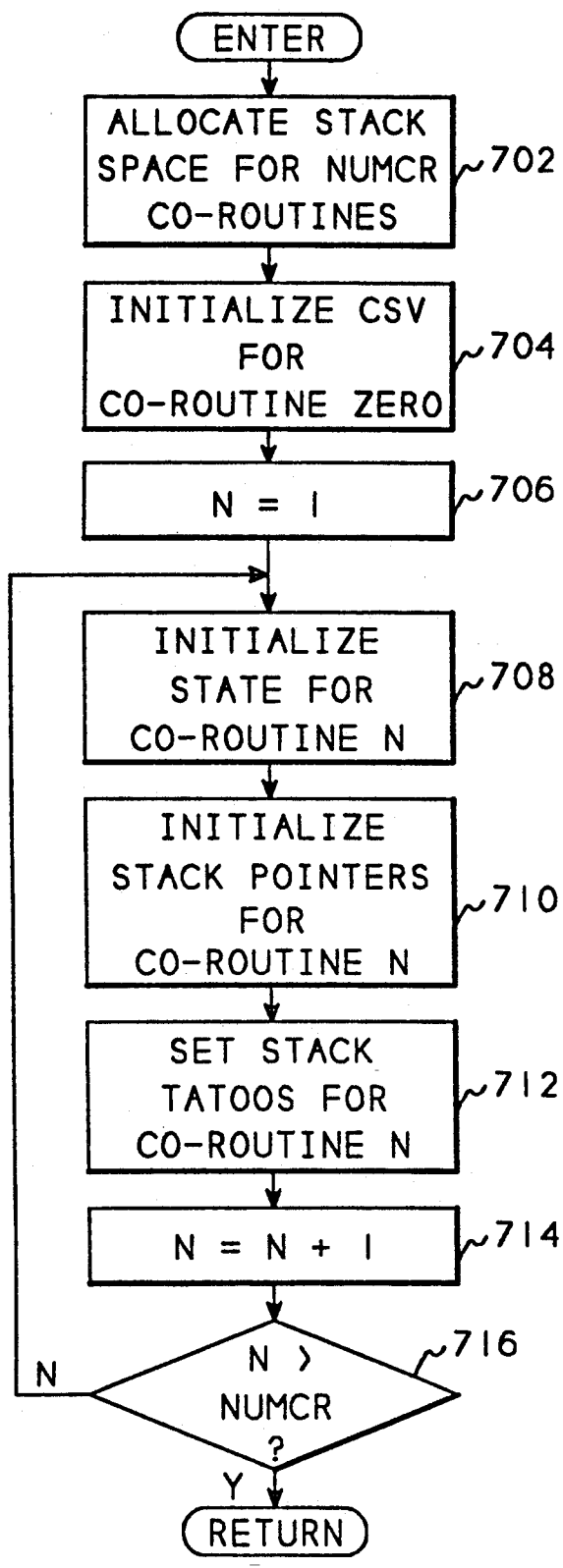
FIG. 7 is a flowchart of the process of creating a plurality of co-routines within a session worker.

FIG. 7 is a flowchart of initializing the co-routines within a session worker. Referring now to FIG. 7, after entry, block 702 will allocate stack space for a plurality of co-routines indicated by the value in the variable NUMCR. This stack space is allocated as an array of stacks within the local variable space of the session worker. Block 704 then initializes a co-routine state vector (CSV) for co-routine 0, which is the main process loop described above with respect to FIG. 6. Block 706 then sets a counter to one and block 708 starts the initialization process for the CSV's for each of the remaining co-routines. Block 708 initializes a state variable for co-routine N, block 710 initializes the stack pointers for co-routine N, and block 712 sets the stack tatoos for co-routine N.

Stack tatoos are values placed at the top and bottom extremes of the stack space for a co-routine. The values selected for a tatoo are values that are unlikely to occur in the normal operation of a co-routine. Because the tatoos are located at the extreme edges of the stack space for a co-routine, and because the tatoo values are unlikely to occur during normal operation of the co-routine, the tatoo values can be checked periodically to determine if the co-routine has exceeded its stack space.

After setting the tatoos, block 712 transfers to block 714 which increments the counter by one. Block 716 then determines if the counter value is as high as the maximum number of co-routines being initialized, and if this value not yet to the maximum number of co-routines, block 716 transfers back to block 708 to initialized another co-routine. After all the co-routines have been initialized, block 716 returns to the caller.

Figure 8:
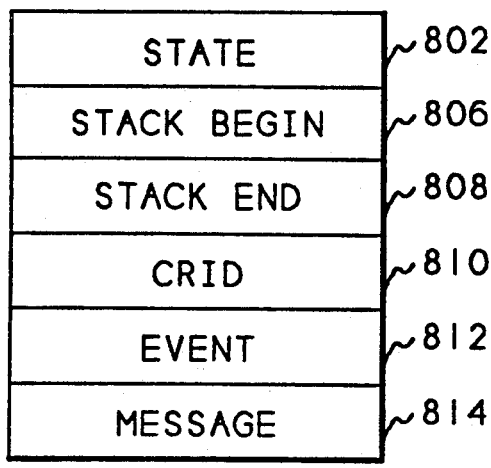
FIG. 8 is a block diagram of a co-routine service vector (CSV) within a session worker process.

FIG. 8 shows a memory layout for a co-routine state vector (CSV). Referring now to FIG. 8, the first variable within the CSV is the STATE variable 802. The STATE variable 802 indicates whether or not the CSV, and therefore the corresponding co-routine, is either free, running, waiting, or ready to be run. The co-routine will be free if it is available to process a new SMB request. Running means the co-routine has control of the processor. Waiting means the co-routine has pended on an event and the event has not yet completed. Ready means an event has completed and the co-routine is ready to resume processing. The STACK BEGIN variable 806 is the address of the beginning of the stack being used by the co-routine. The STACK END variable 808 is the ending address of the stack being used by the co-routine. The CRID variable 810 is a number which is used to associate a co-routine with a particular SMB request. The EVENT variable 812 is used to indicate the type of event upon which the co-routine is waiting, after the co-routine has been pended. When an event is complete and the co-routine is un-pended, the reason for the completion of the event will placed into the MESSAGE variable 814.

Figure 9:
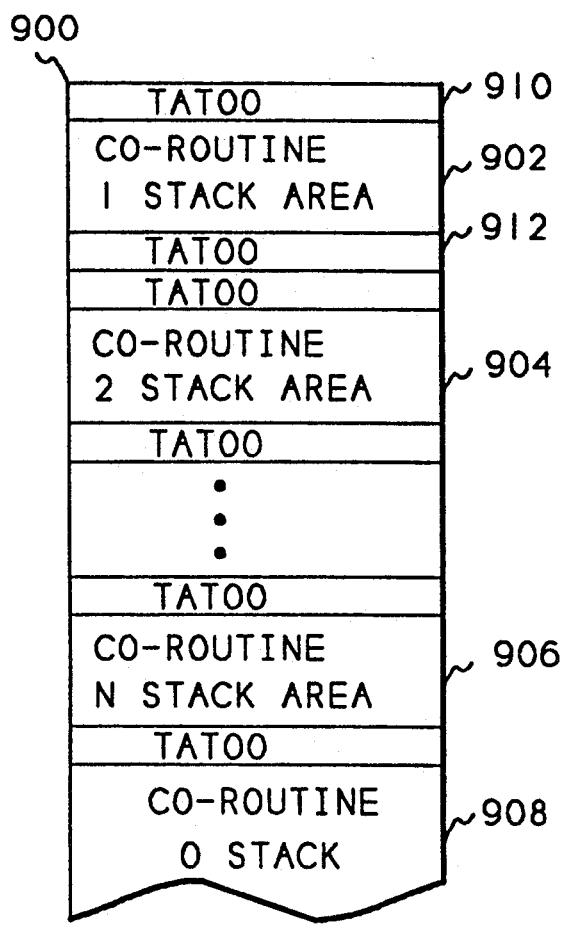
FIG. 9 is a diagram of the stack organization within a session worker process.

FIG. 9 is a diagram of the stack area for a session worker. When the co-routines are initialized, as described above with respect to FIG. 7, the stack space of the session worker is sub-divided and allocated to each of the co-routines, including co-routine 0. Referring now to FIG. 9, the stack for co-routine 1 is shown at 902, the stack for co-routine 2 is shown at 904, and the stack for co-routine N is shown at 906. Because co-routine 0 is the main process loop of the session worker, and because it was entered upon entry into the session worker, the stack for co-routine 0 is located below the stack space for the other co-routines, at reference number 908. A pair of tatoos 910 and 912 are located at the top and bottom respectively of stack space 902 of co-routine 1. Similar tatoos are located in the other stack spaces, except for co-routine 0.

FIG. 9 illustrates the stack space as it will exist on a processor which allows stacks to grow from high memory to low memory. On a processor in which stacks grow from low memory to high memory, the diagram of FIG. 9 would be reversed. FIG. 9 illustrates that the stacks for the co-routines all exist within the memory space of the session worker. Therefore, the co-routines all share memory of the session worker, and no operating system requests are needed or used to manage the memory of the co-routines.

Figure 10:
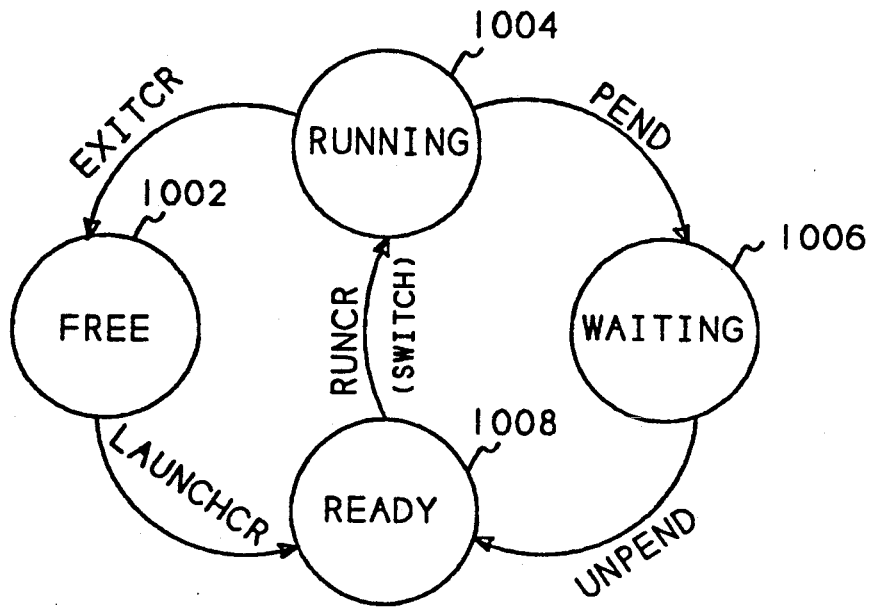
FIG. 10 is a state diagram of the states of a co-routine.

FIG. 10 is a state diagram showing the various states of a co-routine. Referring now to FIG. 10, when initialized, a co-routine will be in the FREE state 1002. After co-routine 0 receives an SMB request, it will call FIG. 11 to launch a co-routine. In the process of launching a co-routine, the co-routine being launched will be changed from the free state 1002 to the ready state 1008. When co-routine 0 schedules the co-routine for execution, co-routine 0 will call the RUNCR function of FIG. 12, which in turn will call the SWITCH function of FIG. 13 to change the scheduled state of the co-routine from the READY state 1008 to the RUNNING state 1004. The co-routine will remain in the RUNNING state 1004 as long as it desires. If a co-routine completes the work assigned to it, it will transfer from the RUNNING state 1004 to the FREE state 1002 by calling the EXITCR function, which is FIG. 16. If the co-routine must wait for some operation, it will transfer from the RUNNING state 1004 to the WAITING state 1006 by calling the pend function FIG. 14. When an event has completed, the main process loop of co-routine 0 will detect the event completion, and call the UNPEND function FIG. 15 which will transfer the pended co-routine from the WAITING state 1006 to the READY state 1008. Thus, in the typical life of a co-routine, the co-routine transfers from the FREE state 1002 to the READY state 1008; then to the RUNNING state 1004; then to the WAITING state 1006 for each operation upon which it must pend; then to the READY state 1008; back to the RUNNING state 1004; and eventually back to the FREE state 1002 after it has completed its work.

Figure 11:
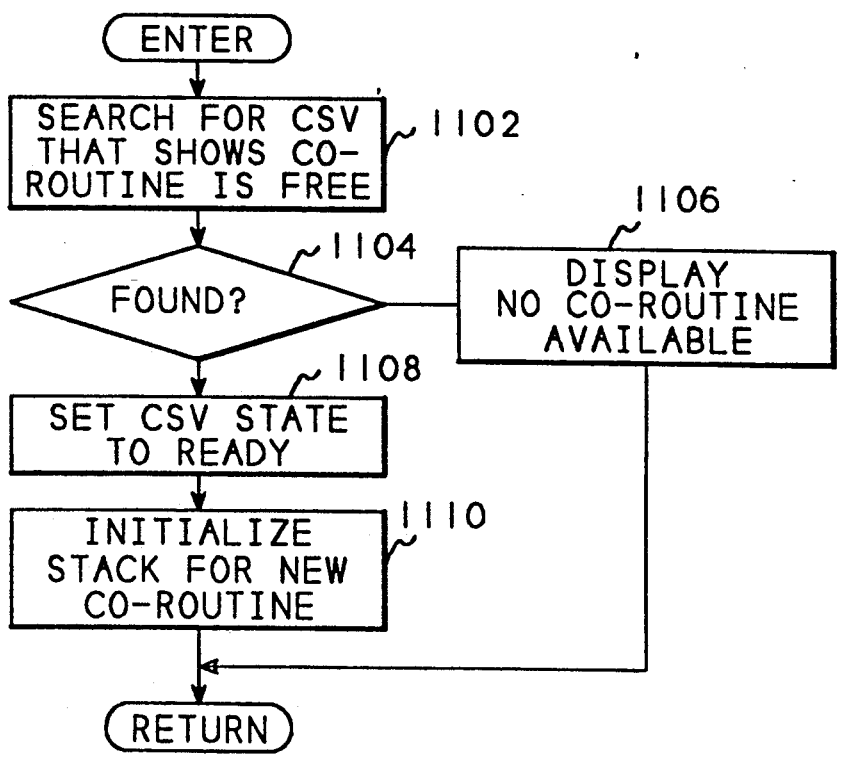
FIG. 11 is a flowchart of the LAUNCHCR function which prepares a co-routine to process an SMB request from a client computer.

FIG. 11 shows a flowchart of the LAUNCHCR function which prepares a co-routine to process an SMB request. Referring now to FIG. 11, after entry, block 1102 searches the CSV's to find a co-routine that is FREE and thus available to process an SMB request. If no CSV is available, block 1104 transfers to block 1106 which displays a no co-routine available message and returns to the caller. If a co-routine is free block 1104 transfers to block 1108 which sets the state in the free CSV to READY which indicates that the co-routine is ready to run. Block 1110 initializes the stack for the new co-routine in preparation for switching control to this new co-routine. The function then returns to its caller.

Figure 12:
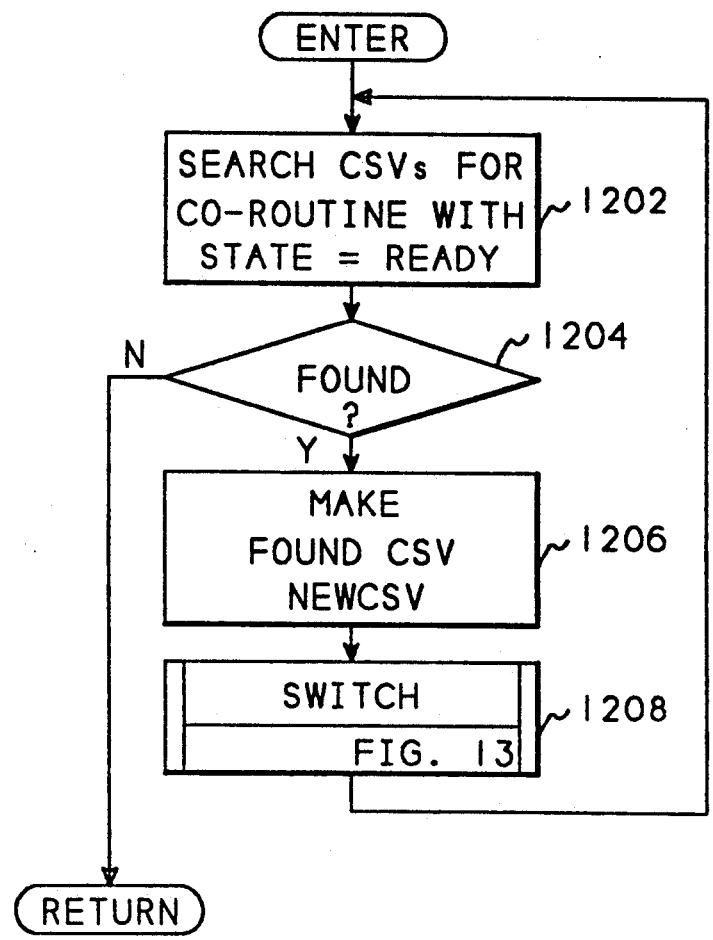
FIG. 12 is a flowchart of the RUNCR function which places a co-routine into a running state.

FIG. 12 is a flowchart of the RUNCR function, which determines the next available co-routine that is ready to run, and transfers control to that co-routine. Referring now to FIG. 12, after entry, block 1202 searches all the CSV's for all the co-routines to find one with a state indicating the co-routine is ready to run. If no co-routine is ready to run, block 1204 returns directly to the caller. If at least one co-routine is ready to run, block 1204 transfers to block 1206 which makes the first co-routine's CSV the NEWCSV which will be run. Block 1206 then transfers to block 1208 which calls the SWITCH function FIG. 13 to transfer control to the CSV that was just placed in NEWCSV. Because the switch sub-routine will transfer control to the new co-routine, FIG. 13 will only return to FIG. 12 if an error occurs.

Figure 13:
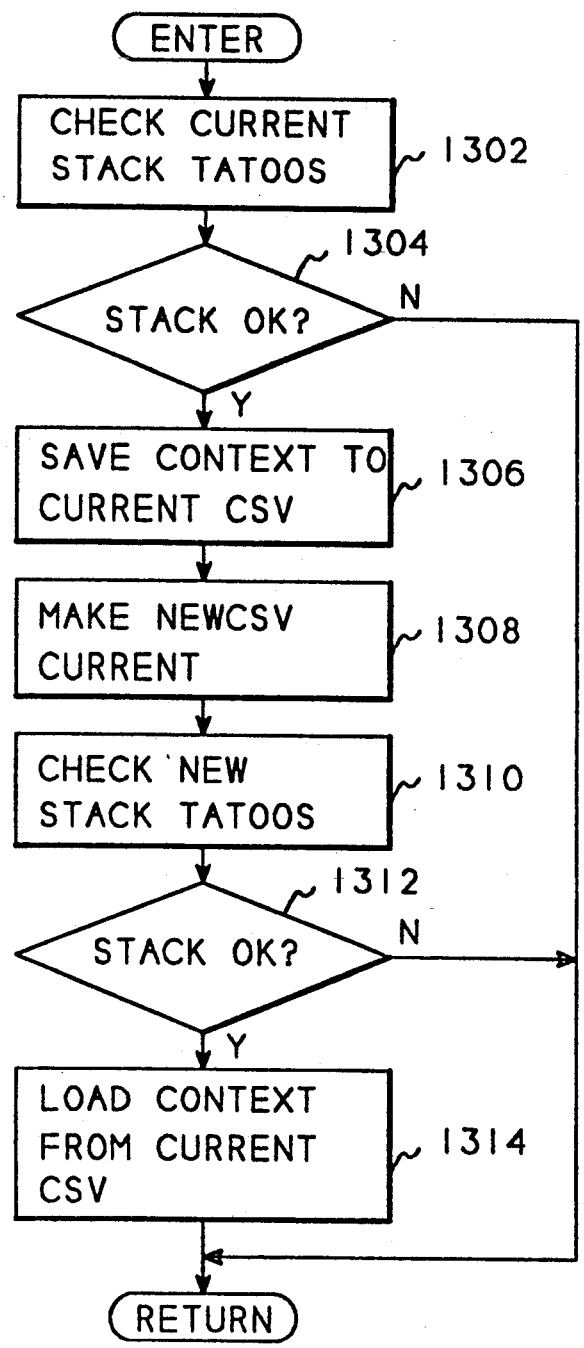
FIG. 13 is a flowchart of the SWITCH function that switches the active co-routines.

FIG. 13 is a flowchart of the SWITCH function which transfers control from one co-routine to another. Referring now to FIG. 13, after entry, block 1302 checks the tatoos of the stack of the currently executing co-routine. If the tatoos for the current stack have been altered, block 1304 returns to the caller where the session worker is cancelled. If the stack tatoos have not been altered, block 1304 transfers to block 1306 which saves the context of the current co-routine into the current CSV. Block 1308 then makes the new CSV, that is, the CSV of the co-routine being transferred to, the current CSV. Block 1310 then checks the tatoos for the stack of the new co-routine and if these tatoos are not valid, block 1312 returns to the caller where the session worker is cancelled. If the stack tatoos for the new co-routine are unaltered, block 1312 transfers to block 1314 which loads the context from the current CSV, thus transferring directly to the co-routine, since part of the context is the program counter for the processor.

In the process of launching a co-routine, the stack of the launched co-routine is set up to appear as if the launched co-routine had called the SWITCH function from the launched co-routine entry point. Therefore, to transfer to the entry point of the routine, SWITCH only needs to set the processor to point to the launched co-routine stack and perform a return. Once executing, the co-routine will pend by calling the PEND function, so the stack will again be set up to allow a return from SWITCH, after an UNPEND operation, to the location following the call to PEND. The system will continue in this manner until the co-routine calls EXITCR to terminate, after which time the co-routine will no longer be given control.

Figure 14:
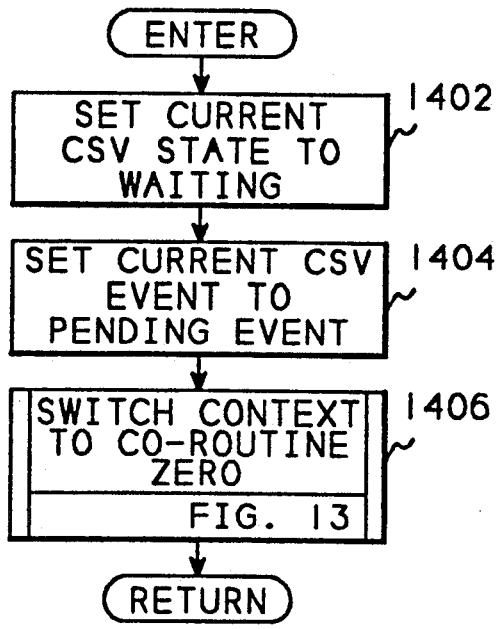
FIG. 14 is a flowchart of the process of pending a co-routine.

FIG. 14 shows a flowchart of the PEND function, which places a co-routine into a waiting state while some event completes. Referring now to FIG. 14, after entry, block 1402 sets the state of the current CSV to WAITING. Block 1404 then sets the EVENT variable within the current CSV to the event that is being pended upon. Block 1406 then calls FIG. 13 to switch the context back to co-routine 0 and to the main processing loop.

Figure 15:
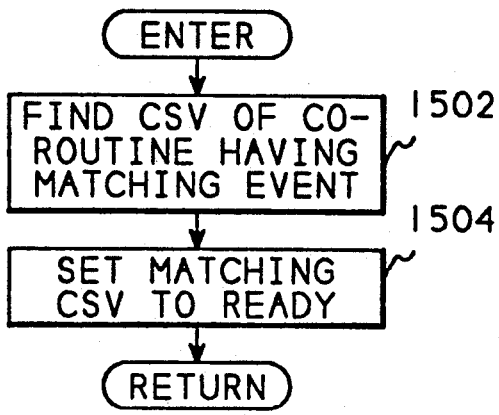
FIG. 15 is a flowchart of the process of un-pending a co-routine.

FIG. 15 is a flowchart of the UNPEND function which places a co-routine back into the ready state after the completion of an event. Referring now to FIG. 15, after entry, block 1502 finds the CSV of a co-routine having an event that matches the event just completed. After finding the CSV, block 1504 sets the state of that CSV to ready so that it can be executed, and then returns to the caller.

Figure 16:
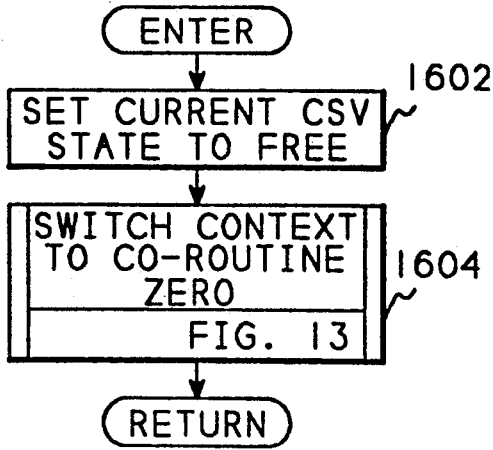
FIG. 16 is a flowchart of the EXITCR function of a co-routine completing a request and making itself inactive.

FIG. 16 is a flowchart of the EXITCR function which is used when a co-routine has completed processing of an SMB request. Referring now to FIG. 16, after entry, block 1602 sets the state of the current CSV to FREE indicating that the co-routine corresponding to this CSV is free for use in processing a new SMB request. Block 1604 then calls FIG. 1 to switch the context back to co-routine 0 and the main processing loop.

Figure 17:
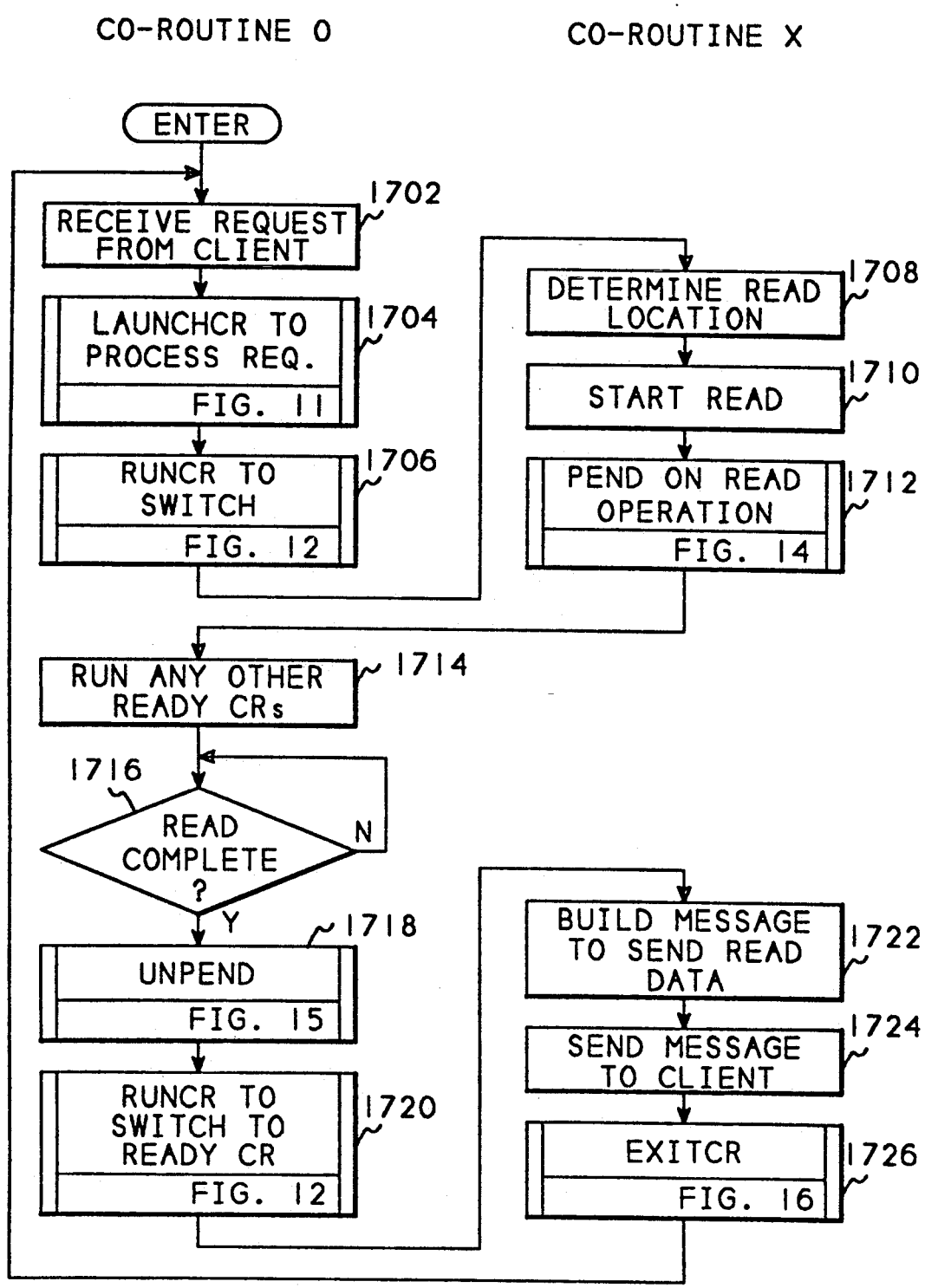
FIG. 17 is a flowchart of an example of a co-routine processing an SMB read request.

FIG. 17 is a flowchart of an example of processing a SMB request for reading data. FIG. 17 shows the flowchart steps in two columns, one column headed by the notation co-routine 0 and the other column headed by the notation co-routine X. The processing steps that occur under the column co-routine 0 are the process of setting up and scheduling other co-routines, while the process steps that occur under the column co-routine X are the actual steps necessary to process the read operation on behalf of the client computer. Referring now to FIG. 17, after entry, block 1702 receives an SMB request to perform a read operation from a client computer. Block 1704 then calls FIG. 11 to prepare a co-routine to process the request. Block 1706 then calls FIG. 12 to run the co-routine that was prepared to process the request. At this point FIG. 12 will call FIG. 13 to switch the session worker context and transfer control to co-routine "X", which is the co-routine that has been prepared to process the SMB request. Therefore, control transfers to co-routine X, at block 1708 which determines the read location specified in the SMB request. Block 1710 then starts the read operation, and because a read operation requires a significant amount of time to get the data and transfer it back into memory, block 1712 will call FIG. 14 to pend co-routine X while the data is being transferred into memory. The pend operation of FIG. 14 will call the SWITCH function of FIG. 13 which will switch the context of the session worker back to co-routine 0 since co-routine X has been pended. Therefore, control resumes in co-routine 0 at block 1714 which will then run any other co-routines that are ready and capable of performing work. When the other co-routines have completed, control will transfer to block 1716 which will wait until the read operation is complete. After the read operation is complete, block 1718 will call UNPEND to place co-routine X back into the READY state, since the event has been completed. Block 1720 will then call the SWITCH function of FIG. 13 to switch the context of the session worker to co-routine X. Therefore, control resumes in co-routine X at block 1722 which uses the read data to build a message in response to the SMB request. Block 1724 then sends the SMB response back to the client computer. After sending the response, control transfers to block 1726 which calls the EXITCR function of FIG. 16 to terminate processing by co-routine X, place co-routine X back into the FREE state, and switch the context of the session worker to co-routine 0. Therefore, control resumes back in co-routine 0 at block 1702 to process the next SMB request from the client computer.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A resource server system for sharing resources on a network comprising:

host processing means containing said resources to be shared, said host processing means being connected to said network;

a plurality of client computers, each connected to said network;

a plurality of session worker means, each located in said host processing means, for accessing said resources through said host processing means, wherein execution of each session worker means is scheduled, by an operating system in said host processing means, to execute concurrently with all other session worker tasks;

supervisor means located in said host processing means for accepting a plurality of calls through said network, wherein said supervisor means starts one of said plurality of session worker means upon receiving a first call for each of said plurality of client computers, and wherein said supervisor means directs all subsequent calls form a client computer to said one of said plurality of session worker means started to process calls from said client computer;

a plurality of co-routine means located in each of said plurality of session worker means for concurrent processing of calls received from a client computer;

a plurality of scheduling means for scheduling concurrent execution of said co-routine means, wherein one of said scheduling means is located in each of said session worker means.

2. The resource server system of claim 1 wherein each of said plurality of scheduling means further comprises:

means for pending a co-routine when said co-routine must wait for an event to be completed;

means for upending a co-routine when said event is complete; and means for discontinuous processing of a first co-routine and starting processing of a second co-routine when said means for pending is operated by said first co-routine, whereby operation of said first co-routine is suspended, and operation of said second co-routine is started.

3. The resource server system of claim 1 further comprising:

means for creating a plurality of stacks and assigning one to each session worker means;

means for partitioning each of said plurality of stacks into a plurality of stack spaces; and means for assigning one of said plurality of stack spaces to each of said plurality of co-routines wherein each co-routine is assigned a stack space from a stack assigned to a session worker having said co-routine located therein.

4. The resource server system of claim 3 further comprising means for determining (910, 912) when each of said plurality of stack spaces has been exceeded.

5. The resource server system of claim 4 wherein said determining means comprises:

means for placing a tatoo within a stack spacer;

means for checking said tatoo each time said co-routine that uses said stack space is scheduled for execution; and means for canceling said session worker whenever said tatoo is altered.

6. The resource server system of claim 3 wherein said session worker means further comprises:

means for creating said plurality of co-routines when said session worker is started;

means for creating said plurality of stack spaces when said session worker is started;

means for starting one of said plurality of co-routines upon receiving a resource access request from said client computer.

7. A method for processing, by a host computer, a plurality of simultaneous resource access requests from each of a plurality of client computers in a local area network, said method comprising the steps of:

(a) establishing a connection between each of said plurality of client computers and said host computer, each of said connections being established by supervisor software within said host computer, wherein said establishing each of said connections comprises the steps of
  (a1) creating a plurality of separate session worker tasks within said host computer, one of said plurality of separate session worker tasks being established for processing said simultaneous resource access requests from each of said plurality of client computers, and assigning a stack to each of said plurality of separate session worker tasks, wherein each of said plurality of session worker tasks is scheduled by an operating system within said host computer to operate concurrently with all other of said plurality of session worker tasks,
  (a2) creating a plurality of co-routine tasks within each of said plurality of separate session worker tasks, and
  (a3) connecting one of said plurality of separate session worker tasks to each of said plurality of client computers;
(b) concurrently processing said plurality of simultaneous resource access requests within a session worker task having a plurality of co-routines created therein, comprising the steps of:
  (b1) partitioning said stack assigned to said session worker into a plurality of stack areas;
  (b2) assigning one of said plurality of stack areas to each of said plurality of co-routines created within said session worker task to provide stack space for each of said plurality of co-routines to provide a storage area for use in processing resource access requests;
  (b3) if a request is available, receiving said request comprising the steps of
    (b3a) retrieving said request from said local area network, and
    (b3b) readying a free one of said plurality of co-routines within said session worker to process said retrieved request, and supplying said request to said free one of said co-routines,
  (b4) if any one of said plurality of co-routines is ready and not pended, executing said one co-routine, wherein said one co-routine becomes an executing co-routine,
  (b5) pending said executing co-routine when said executing co-routine determines that said executing co-routine must wait for an event to complete,
  (b6) unpending any of said plurality of co-routines that pended on an event, when said event completes,
  (b7) freeing any of said plurality of co-routines that has completed processing of a request, and
  (b8) continuing with step (b3).

8. The method of claim 7 wherein said executing said co-routine of step (b4) comprises the steps of:
  storing a context of any previously executing co-routine,
  loading a contest of said ready and not pended co-routine; and
  transferring processor control to said ready and not pended co-routine.

9. The method of claim 7 wherein step (b2) further comprises the steps of:
  (b2a) installing a stack tatoo in each stack area assigned to each of said co-routines.

10. The method of claim 9 wherein step (b5) further comprises the step of said examining said tatoo and canceling said session worker if said tatoo has been altered.

11. The method of claim 9 wherein step (b2a) further comprises the step of installing said stack tatoo at a top end and at a bottom end of each of said stack areas.

* * * * *

UNITED STATES PATENT AND TRADEMARK OFFICE
CERTIFICATE OF CORRECTION

PATENT NO. : 5,276,879
DATED : January 4, 1994
INVENTOR(S) : Timothy G. Barry, George H. Robbert, James R. Conrad It is certified that error appears in the above-indentified patent and that said Letters Patent is hereby corrected as shown below:

Col. 6, l. 60: delete "to" and insert --to-- after "back"

Col. 7, l. 50: change "sended" to --pended--.

In the Claims:

Col. 12, Claim 1, l. 7: delete "for" and insert therefor --from--

Col. 12, Claim 1, l. 9: delete "form" and insert therefor --from--

Col. 12, Claim 2, l. 28: delete "discontinuous" and insert therefor --discontinuing--

Col. 12, Claim 4, l. 46: delete "(910,912)"

Col. 14, Claim 8, l. 25: delete "contest" and insert therefor --context--

Signed and Sealed this

Twenty-first Day of January, 1997

Attest:

BRUCE LEHMAN

*Attesting Officer*   Commissioner of Patents and Trademarks